No. 766,014. PATENTED JULY 26, 1904.
N. BARRY, Jr. & P. J. BARRY.
BUTTON MAKING MACHINE.
APPLICATION FILED SEPT. 8, 1903.
NO MODEL. 9 SHEETS—SHEET 1.

No. 766,014. PATENTED JULY 26, 1904.
N. BARRY, Jr. & P. J. BARRY.
BUTTON MAKING MACHINE.
APPLICATION FILED SEPT. 8, 1903.
NO MODEL. 9 SHEETS—SHEET 6.

WITNESSES: INVENTORS
N. Barry Jr. & P. J. Barry
BY Alexander D. Fowell
Attorneys.

No. 766,014. PATENTED JULY 26, 1904.
N. BARRY, Jr. & P. J. BARRY.
BUTTON MAKING MACHINE.
APPLICATION FILED SEPT. 8, 1903.
NO MODEL. 9 SHEETS—SHEET 7.

No. 766,014. PATENTED JULY 26, 1904.
N. BARRY, Jr. & P. J. BARRY.
BUTTON-MAKING MACHINE.
APPLICATION FILED SEPT. 8, 1903.
NO MODEL. 9 SHEETS—SHEET 9.

WITNESSES
INVENTORS
N. Barry Jr. and P. J. Barry
BY Alexander F. Dowell
Attorneys.

No. 766,014.                                                    Patented July 26, 1904.

UNITED STATES PATENT OFFICE.

NICHOLAS BARRY, JR., AND PATRICK J. BARRY, OF MUSCATINE, IOWA.

BUTTON-MAKING MACHINE.

SPECIFICATION forming part of Letters Patent No. 766,014, dated July 26, 1904.

Application filed September 8, 1903. Serial No. 172,307. (No model.)

*To all whom it may concern:*

Be it known that we, NICHOLAS BARRY, Jr., and PATRICK J. BARRY, of Muscatine, Muscatine county, Iowa, have invented certain new and useful Improvements in Button-Making Machines; and we hereby declare that the following is a full, clear, and exact description thereof, reference being had to the accompanying drawings, which form part of this specification.

This invention is an improved machine for manufacturing pearl and bone buttons, the present machine being adapted to "face," "center," and "drill" the buttons from previously-formed blanks by successive series of operations performed on the blanks while they are held by the chucks, the operator having merely to feed the blanks to the chucks, the remaining operations occurring automatically in proper order and sequence and the finished buttons, ready for polishing, being delivered from the machine. The machine is especially designed to economize room and power, all parts being accessible and provision being made for ready adjustment of the of the several parts and also for sharpening the facing or centering tools automatically.

The invention in several particulars is an improvement upon the button-machines shown in United States Patent No. 643,587 of February 13, 1900, and drilling-machine, Patent No. 659,192, of October 2, 1900, and utilizes the tool-holder shown in Patent No. 643,585 of February 13, 1900, and the chuck shown in Patent No. 643,586 of February 13, 1900.

In the present invention we employ two rotary sets of tools, using one set for facing and centering the blanks and the other set for drilling them. Combined with these two sets of tools is an endless-chain series of chucks which operate in connection with both sets of tools, and a suitable cam track or guideway traversed by the chucks is arranged to uphold them in proper working positions during certain portions of their travels. Suitable rotary guides are also provided by which the chucks or button-holders are brought into alinement with the coöperating tools at the proper times, so that perfect and uniform work is insured, the operations on the blanks occurring while the chucks are moving. Means are also provided for rapidly rotating the chucks under the cutting or centering tools and for turning them step by step while at the drilling end of the machine, so that a plurality of properly-spaced holes may be pierced or bored in the blanks. Means are also provided for withdrawing the dust from the chucks and holders during the facing and centering operations and for removing the finished buttons from the chucks by suction. In short, the machine is adapted to perform all the operations necessary to face, center, and drill the buttons and to operate simultaneously upon a number of blanks, the operator merely having to feed the blanks to the machine, all the other operations being automatically performed by the mechanisms thereof.

We refer to the claims appended to the following detailed description of the machine illustrated in the accompanying drawings, which is the best now known to us for summaries of the several novel features and combinations of parts constituting the present invention and for which protection is asked.

In the drawings, Fig. 3 is a rear end view.

A vertical shaft 2 is journaled in suitable bearings in the upper and lower members 1 and $1^a$ of the main frame of the machine, said shaft being rotated by means of a worm-gear $2^a$, meshing with a worm $3^a$ on a short horizontal shaft 3, journaled in suitable bearings on the lower member 1 of the main frame, (see Fig. 5,) and said shaft carries a loose pinion $3^b$, provided with a clutch member $3^c$, which may be engaged or disengaged by a clutch member $3^d$, splined on shaft 3 and movable into or out of engagement with member $3^c$ by means of the lever $3^e$, which can be operated by hand.

Figure 4:
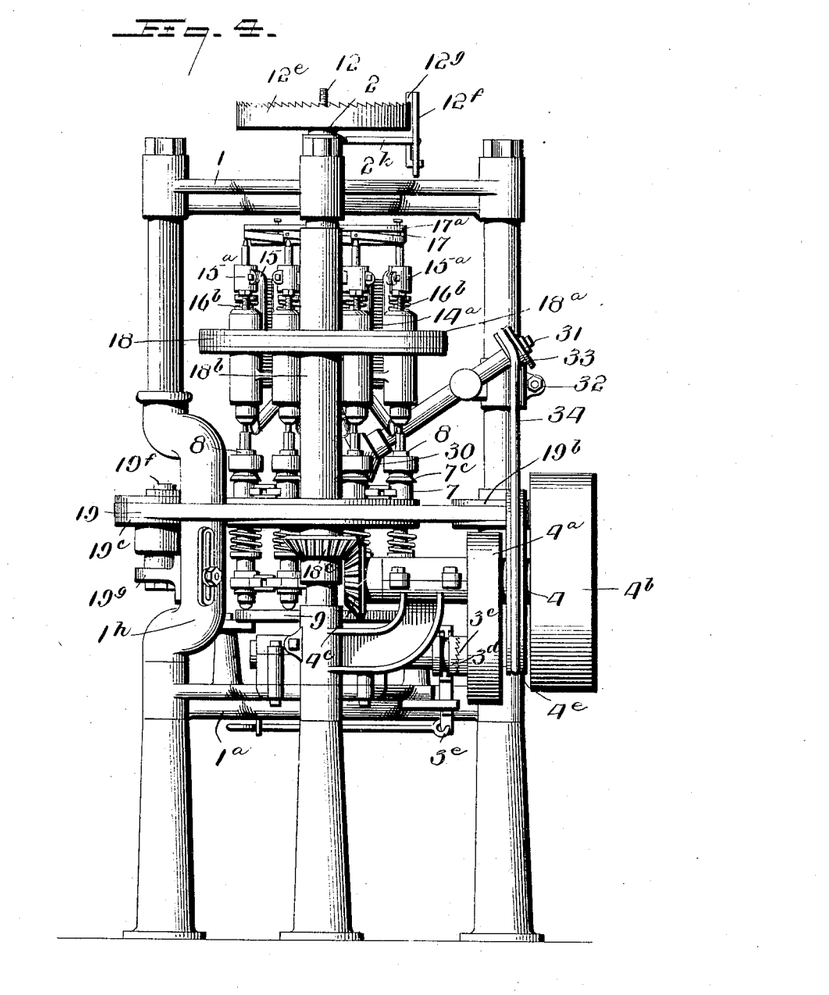
Fig. 4, a front end view.

Pulley $3^a$ is driven by a belt from pulley $4^a$ on a shaft 4, journaled in suitable bearings attached to the main frame, as indicated in Fig. 4, said shaft being provided with a fly belt-wheel $4^b$ on its outer end, as shown.

At the opposite end of the frame is a second vertical shaft 5, which is parallel with shaft 2 and is journaled in boxes $5^a$, which are adjustable horizontally by means of screws $5^b$, so as to move the shaft 5 toward or from shaft 2.

*The blank-carriers.*—On each of the said shafts, just above the base-plate $1^a$, are secured double-sprocket disks 6 and $6^a$, which are rotatable with the shafts, and said disks 6 $6^a$ are adapted to guide the button-blank holders or chucks during the operation on the blanks, the chuck-holders forming members of an endless chain on carrier running between and controlled by the disks on the adjacent shafts, as shown.

The chuck-holders consist of an upper sleeve 7 and lower sleeve $7^d$ in vertical alinement and preferably rigidly connected by an arm $7^b$. (See Fig. 16.) These sleeves 7 $7^d$ are spaced apart, so that the upper sleeve 7 will engage the notches in disks 6 and the lower sleeve $7^d$ the notches in disks $6^a$. The sleeves 7 and $7^d$ are provided with circumferential flanges $7^c$, by which they are upheld on the disks 6 and $6^a$. Preferably the notches on the disks 6 $6^a$ are provided on the upper sides with upwardly-inclined or bevel flanges $6^c$ $6^d$ to prevent dust collecting between the disks and sleeves, so as to displace the latter. The flanges $7^c$ on the upper sleeve 7 are also preferably skirt-flanges to direct dirt or dust away from the notches in the disk 6. The sleeves 7 $7^d$ are moreover provided with laterally-extending perforated ears $7^e$ and $7^f$, and adjacent ears are pivotally connected by links $7^h$ $7^i$, as shown, so that the connected series of sleeves 7 $7^d$ forms an endless carrier which is mounted upon and between the disks 6 $6^a$ on adjacent shafts 2 and 5. As the shafts are shown as vertical, the carriers will also be vertical, and the chucks therein will maintain a vertical position and travel laterally.

Figures 5, 16:
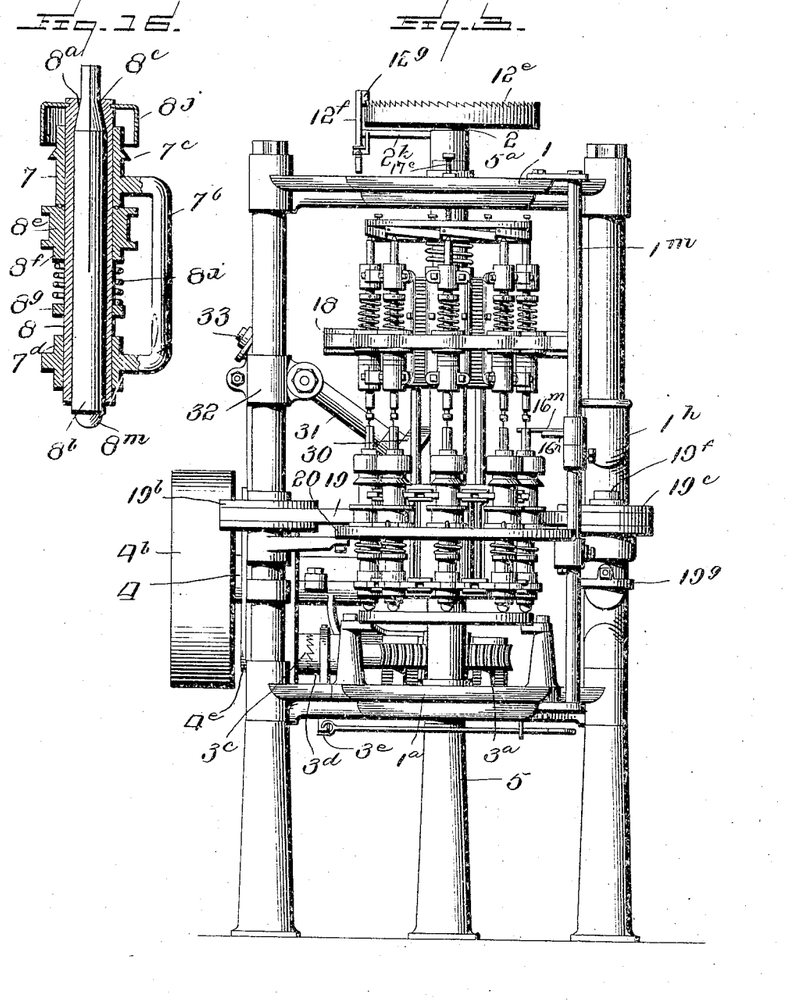
Fig. 5 is a section on line 5 5, Fig. 1.
Fig. 16 is an enlarged detail sectional view of one of the button-holders and its connections.
Figure 5:
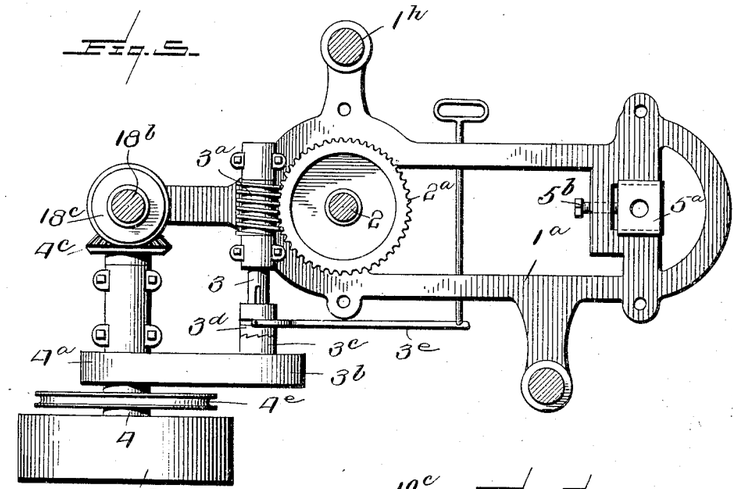
Figure 6:
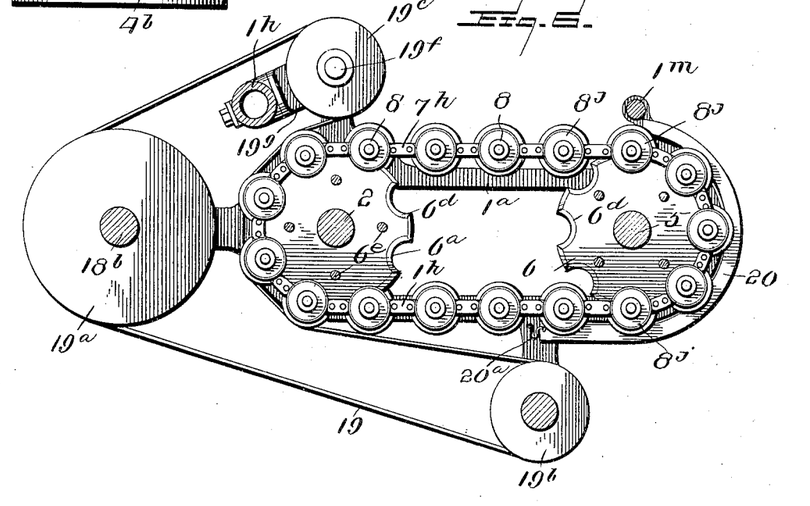
Fig. 6, a horizontal section on line 6 6, Fig. 1.
Figure 7:
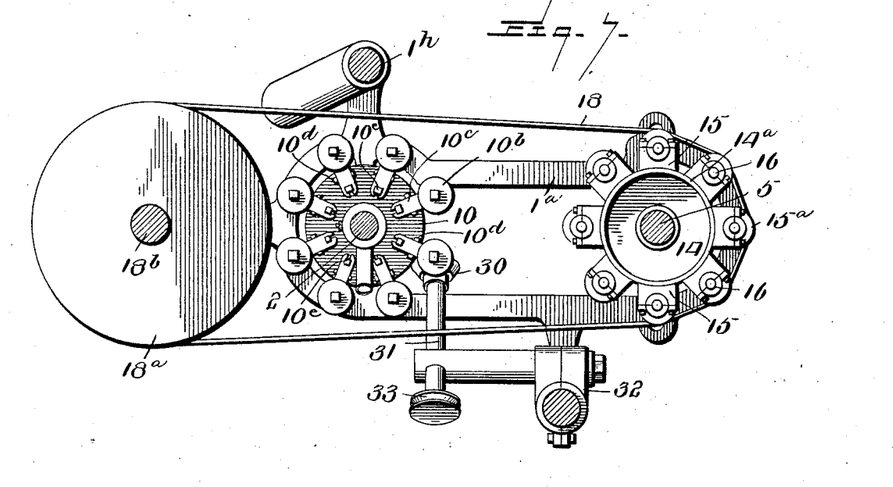
Fig. 7, a similar view on line 7 7, Fig. 1.
Figure 8:
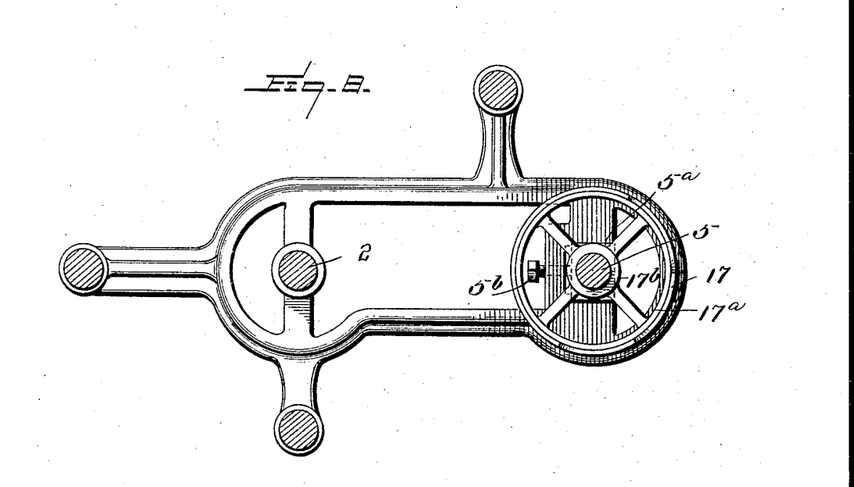
Fig. 8, a similar view on line 8 8, Fig. 1.

The button-holders are preferably constructed substantially as shown and described in Patent No. 643,586 and comprise rotatable tubes 8, journaled in and extending through each pair of sleeves 7 and $7^d$, as shown, said tubes having interior conical shoulders $8^a$ at their upper ends. Slidably fitted within and extending through the tubes are the chucks $8^b$, which are splined to the tubes to rotate therewith, but are capable of vertical or longitudinal movement in the tubes. Each chuck has a split upper end recessed to receive a button-blank and a conical shoulder $8^c$, adapted to engage with shoulder $8^a$ of the tube, so as to contract the split end of chuck and cause it to clamp a button-blank firmly as long as the chuck is held against the shoulder in the tube. This chuck is preferably hollow, as shown, and is provided at bottom with a ball or caster $8^m$. On the tube 8 is splined a pulley $8^e$ and a square block $8^f$, (the pulley and block may be formed integral, if desired,) and below the block a collar $8^g$ is fixed to the sleeve, and between the collar and block is a coiled spring $8^i$, which tends to press the tube down and keeps the shoulders $8^a$ and $8^c$ of the tube and chuck in contact and the chuck closed so long as the latter is upheld by its track 9. We prefer to use friction-rollers $8^n$ between the pulleys $8^e$ and the sleeves 7, as shown in Fig. 16, to lessen friction.

Extending beneath the endless series of carriers and conforming to the path traversed thereby is a track or camway 9, which is adapted to uphold the chucks $8^b$ while the blanks therein are being operated upon and then to permit the chucks to drop sufficiently to release the button and receive another blank before they reach the facing and centering tools. The buttons are fed by the operator to the chucks as they move along the front side of the machine on the straight run of the carrier between the sets of facing or centering and drilling tools, at which point the track is dropped, as at $9^a$. Then just before the chucks reach the facing or centering tools (or the disks 6 $6^a$ on shaft 2) there is a rise $9^b$ in the track, which causes the chucks to rise and close on the buttons, and the chucks are held closed while engaged with disks 6 $6^a$ by a flat portion $9^c$ of the track, and just as they enter the straight portion of the return run at the opposite side of the machine there is a slight drop $9^d$ in the track, which allows the chucks to drop sufficiently to disengage the blanks from the cutters while still firmly holding the blanks, and the chucks are again raised to normal position (as or before they are taken control of by disks 6 and $6^a$ on shaft 5) by a slight cam rise $9^f$ in the track and remains in upheld position until they reach the opposite side of the shaft 5, where they reach the portion $9^a$ of the track and drop sufficiently to release the blanks, which are immediately removed by hand or otherwise.

In order to prevent dust working into and between the tubes 8 and sleeves 7, we attach inverted-cup-shaped guards $8^j$ to the upper ends of the tubes, as shown in the figures.

*The button-facing tools.*—On the shaft 2 above the 6 is a tool-carrier comprising a circular disk 10, having an elongated hub $10^a$ splined on the shaft 2, so as to rotate therewith, but movable longitudinal thereof. Attached to the periphery of the disk 10 at equal distances apart are a series of tool-holders comprising vertical sleeve portions $10^b$, provided with a slotted lateral arm $10^c$, which is guided between lugs $10^d$ on carrier 10 and is adjustably secured thereto by a bolt $10^e$, permitting radial adjustment of the holder on the carrier. In each sleeve $10^b$ is a tool-holder 11, in which is secured a facing or centering tool $11^a$ of any desired construction. This holder 11 projects above the sleeve and carries a weight $11^b$, by which the tool is yieldingly pressed to its work. The tool $11^a$ may be adjusted and projected more or less from the holder by a screw $11^c$, as shown. The tool-holder is preferably constructed substantially as described in Patent No. 643,585 and the carrier substantially as described in Patent No. 643,587.

The tools $11^a$ when the holders are properly adjusted will be spaced apart like the chucks, so that the tools $11^a$ will coincide with the chucks which come in the embrace of disks 6 $6^a$ and will operate upon the blanks held by such chuck during approximately a half-revolution of shaft 2, which is sufficient to permit the tools to properly face and center the blanks.

Figures 14, 15:
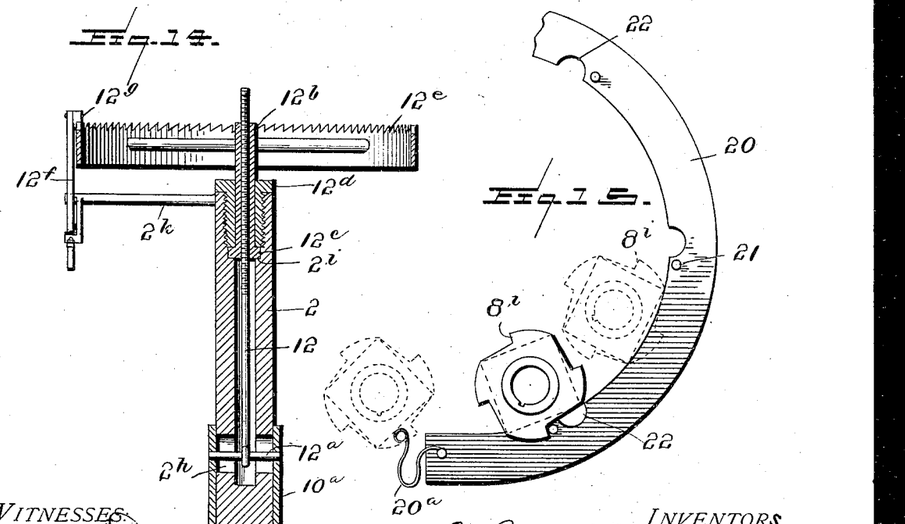
Fig. 14 is an enlarged detail sectional view of the upper end of shaft 2, showing means for automatically compensating for the wear of the facing or centering tools.
Fig. 15 is a top plan view of the curved guide 20 and means for turning the blocks of the chuck-holder.

As the facing or centering tools are subjected to considerable wear, we provide automatic compensating devices therefor, so as to gradually lower the set of tools toward the chucks. The upper end of shaft 2 is bored out, and within the hollow end of the shaft is inserted a threaded rod 12, the lower end of which is connected by a pin $12^a$ with the hub $10^a$ of the tool-carrier 10, pin $12^a$ passing through the slots $2^h$ in the sides of shaft 2, as shown in Fig. 14. The rod 12 is threaded to a sleeve $12^b$, having a flange $12^c$ on its lower end by which said sleeve is supported on a shoulder $2^i$ on the upper end of shaft 2, and tapped into a threaded enlargement of the bore of the shaft 2 is a bushing $12^d$, which engages flange $12^c$ and confines sleeve $12^b$ in the shaft, permitting its rotation therein. On the projecting upper end of sleeve $12^b$ is fixed a ratchet-wheel $12^e$ of large diameter, and on an arm $2^k$, projecting from the upper end of a shaft 2, is pivoted a lever $12^f$, carrying a pawl $12^g$, engaging the ratchet-wheel $12^e$, and during the rotation of the shaft and ratchet-wheel the lower end of lever $12^f$ engages a lug $12^h$ on the frame and is caused to rock in riding over the lug, and thereby moves the ratchet-wheel one or two teeth, slightly turning sleeve $12^b$, and thus moving rod 12 and the tool-carrier 10 downward and automatically compensating for the wear on the tools.

*The dust-collecting devices.*—It is desirable to remove the dust and grit caused by the action of the facing and centering tools, and for this purpose we construct the carrier 10 with an annular depression or chamber $10^k$ around its hub, from which chamber radiate pipes $10^m$, one for each cutting-tool and terminating near the point of the latter, so as to be close to but out of the way of the chucks and tools during the facing and centering operations. Above chamber $10^k$ is a stationary inverted-cup-shaped cap 13, which is surrounded by the hub of carrier 10 and may be suspended on a flange $10^n$ thereon, the lower open end of cup 13 fitting within chamber $10^k$. (See Fig. 12.) This cup has a nozzle $13^a$ connected by a pipe $13^b$ with any suitable suction device, so as to create a suction through pipes $10^m$ and chamber $10^k$ sufficient to withdraw the dust and cuttings from the blanks being operated upon to a suitable place of deposition. As some of the tools (at the side next shaft 5) will not be in operation, the cup 13 may be provided with a flange $13^c$ at that side, so as to cut off or close the innermost pipes leading to inactive tools, and thus increase the suction at the active tools.

In order to insure unison of movement between the disks 6 $6^a$ and the tool-carriers 10 and 14, bolts $6^e$ may be attached to one member and engage corresponding openings in the other, so as to insure their turning in unison and permit the tool-carrier to be adjusted vertically to and from the disks.

Figures 12, 13:
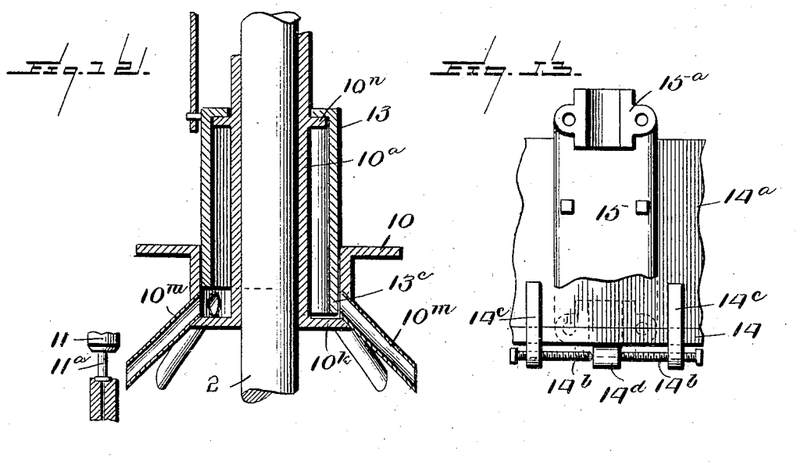
Fig. 12 is an enlarged detail sectional view of the dust-collecting device.
Fig. 13 is a detail side elevation, partly broken away, of the cylinder $14^a$ and its attached spindle-holders and means for adjusting the cylinder.

*The piercing or drilling tools.*—Mounted upon the shaft 5, above the disk 6 thereon, is a disk-casting 14, which is fixed to the shaft 5 and rotates therewith. Upon this disk is supported a cylinder $14^a$, which rotates with the disk, but is capable of slight rotatory adjustment thereon by means of the screws $14^b$, tapped through depending lugs $14^c$ on cylinder $14^a$ and adapted to impinge against a lug $14^d$ on the disk, as shown in Fig. . This adjustment enables the drills to be simultaneously adjusted to pierce the blanks at different distances from the centers thereof, as may be desired.

Figure 9:
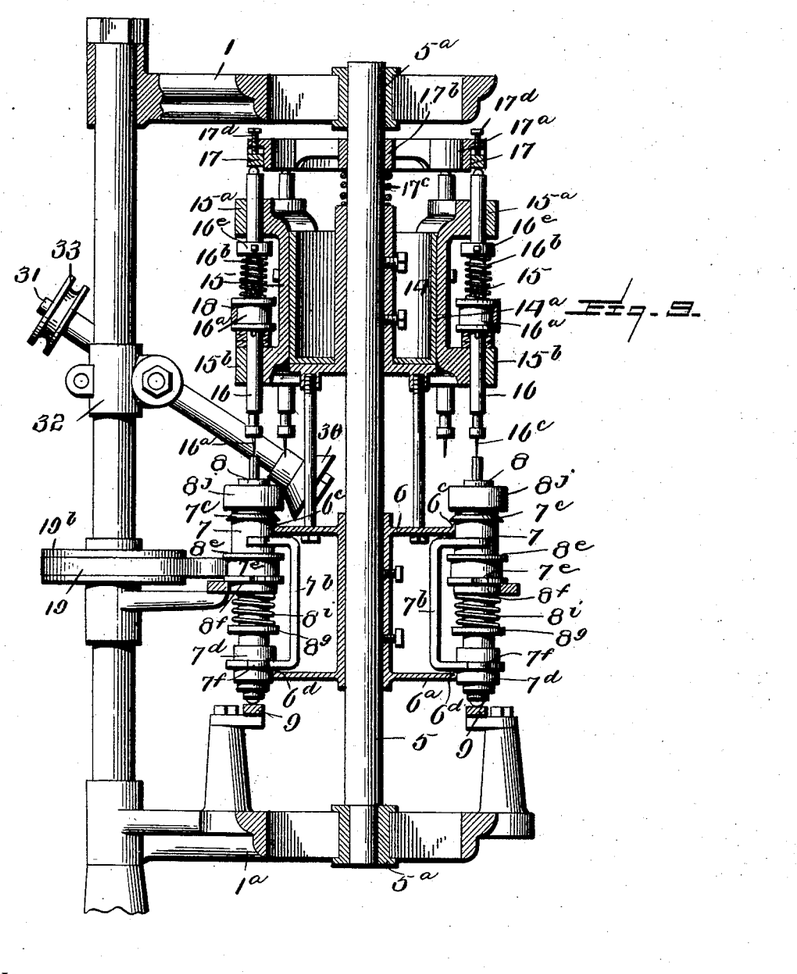
Fig. 9 is a vertical section on line 9 9, Fig. 1.
Figures 10, 11:
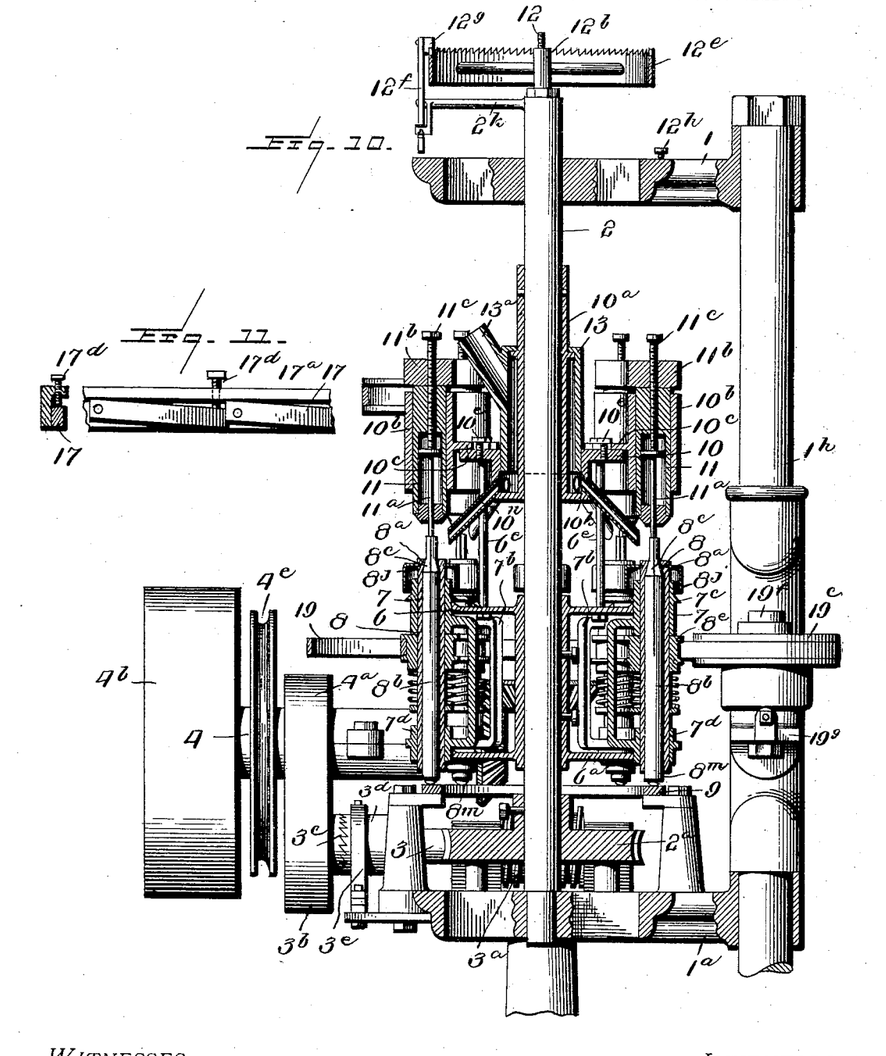
Fig. 10, a vertical section on line 10 10, Fig. 1.
Fig. 11 is a partial side elevation and section of the curved cam-plate and stationary annulus.

Attached to the periphery of cylinder $14^a$ at equal distances apart, corresponding to the distances apart of the chucks, are a series of spindle-holders 15, provided with upper and lower sleeves $15^a$ $15^b$ for the guidance of the spindles 16, which latter are provided with pulleys $16^a$, splined upon the spindles, so the latter can play through the pulleys. The spindles are normally upheld by springs $16^b$, interposed between collars $16^e$ and the pulleys, which latter rest upon the lower bearings $15^b$ of the spindle-holders. The holders are fastened to the cylinder by bolts, as shown, or in other convenient manner, so that their spindles are held in parallelism and move with the cylinder. The upper ends of spindles 16 project above the upper sleeves 15$^a$ and are adapted to contact with a curved cam-plate 17, pivotally attached at one end to a stationary annulus 17$^a$, supported by arms from a hub 17$^b$, loosely mounted on shaft 5 above the series of spindles, said hub and annulus being uplifted by a spring 17$^c$, interposed between the hub 17$^b$ and the hub of the disk 14, as shown in Fig. 9. The free ends of cam-plate 17 can be adjusted by means of screws 17$^d$, tapped through the annulus, and the entire annulus can be vertically adjusted by means of bolts 17$^e$, tapped through the top member of the frame, as shown.

Drills 16$^c$ or other desired tools are attached to the lower ends of spindles 16 in the usual manner and are adapted to operate upon a blank in an opposed chuck while the drill and chuck are traveling together around shaft 5. Drills 16$^c$ can be readily set in the spindles by means of the setting-arm 16$^m$, which is attached to a collar 16$^n$ on one of the upright tie-rods 1$^m$ of the main frame. (See Fig. 3.) This arm 16$^m$ can be swung in under the drill-spindles and the drills rested thereupon while being fastened to the spindles, insuring all the drill-points being in the same plane.

The drill-spindles 16 are normally upheld by springs 16$^b$, so that the drills cannot operate upon the blanks; but cams 17 are arranged to be successively engaged by the upper ends of the drill-spindles and force the latter down, so as to cause the drills to pierce the blanks in proper order, each drill operating a plurality of times on the blank held in the opposed chuck while the spindle and chuck are traveling together. The drills are all set at first to centrally pierce the button-blanks. Then by slightly moving cylinder 14$^a$ (rotatively) on disk 14 the drills are caused to operate more or less off the centers of the blanks, according to the adjustment of cylinder 14$^a$ on the disk, substantially as described in the aforesaid Patent No. 659,192.

The drill-spindles are rotated during the drilling operations on their own axes by means of the belt 18 passing around the series of spindles and engaging the pulleys on the outermost spindles, said belt being driven from a pulley 18$^a$ on a vertical shaft 18$^b$, parallel with shafts 2 and 5 and located exterior to shaft 2 and supported in bearings in the upper and lower members 1 and 1$^a$ of the main frame, as shown. Shaft 18$^b$ is driven by a bevel-gear 18$^c$ on its lower end, meshing with a bevel-gear 4$^c$ on the inner end of shaft 4, as shown in Fig. 5. The chucks are also rotated on their own axes while they are under control of sprocket-disks 6 6$^a$ on shaft 2 by means of a belt 19, which runs from a pulley 19$^a$ on shaft 18$^b$ to an idler 19$^b$ on the frame, then back around the series of chuck-pulleys exterior to shaft 2 to an adjustable idler 19$^c$, and thence back to the pulley 19$^a$, as shown in Fig. 2. Thus the chucks are rotated on their axes at the proper times and left stationary at other times. We do not restrict ourselves to driving either chucks or tools, either or both of which may be rotated to effect the desired operations within the scope of the invention. The pulley 19$^c$ is mounted on a stub-shaft 19$^f$, adjustably mounted on a bracket 19$^g$, which is vertically adjustable on one of the standards 1$^h$ of the main frame. This standard 1$^h$ is bent so as to get the pulley 19$^c$ out of the way of the feeder or attendant who feeds the blanks to the machine, as shown in Fig. 1.

The plates 1 and 1$^a$ are supported and connected by several vertical standards suitably constructed to give stability and rigidity to the framework and afford supports for the several operative parts of the machine; but we do not restrict ourselves to any particular construction or design of supporting-frame, and while we have shown the series of chucks and sets of tools moving in horizontal planes we do not restrict ourselves to such positions of parts.

In order that the same drill may operate successively on the same blank, so as to make a plurality of holes therein at the proper points, it is necessary to partially rotate the chucks after each piercing operation until the desired number of holes are drilled. In making four-hole buttons four cams 17 are employed, and the chucks are turned one-fourth a revolution after each hole is pierced, as follows: As the chucks come up to the sprockets 6 6$^a$ on shaft 5 one of the straight sides of the square block 8$^f$ on the chuck-holder comes into sliding contact with the inner edge of a curved guide 20, (see Figs. 3 and 15,) which prevents the chuck rotating during its travel with the drills around shaft 5. In order to prevent the corners of the squared portion of the blocks 8$^f$ striking the end of the guide 20 and possibly injuring the chucks or guide, we attach a spring 20$^a$ to the end of guide, as shown in detail, which will yieldingly engage the corner of an approaching block 8$^f$ and cause it to turn so as to bring a flat face of the block against the inner edge of the guide without shock or injury to the parts. At proper intervals pins 21 are attached to the guide and are successively engaged by notches 8$^i$ in the flange of the pulley 8$^e$ on the chuck, as shown, and when a notch engages a pin the chuck is compelled to turn sufficiently to let the notch pass the pin. Recesses 22 are cut in the inner edge of guide 20 adjacent to the pins, and the corners of block 8$^f$ enter such recesses when the notches engage the pins and permit the chuck to partially rotate until the pin 21 is passed and another face of block 8$^f$ comes against the edge of the guide. Thus at each pin the chuck is given a quarter-turn, and the drills pierce a hole in the blank at a different point each time they descend. This operation is similar to that described in said Patent No. 659,192. The drills and chuck-turning devices act alternately, so that the holes are properly drilled. When two-hole buttons are to be made, the second and fourth cams 17 can be thrown out of operation, so that the drills will only act twice upon the blanks and pierce holes therein at diametrically opposite points.

Figure 1:
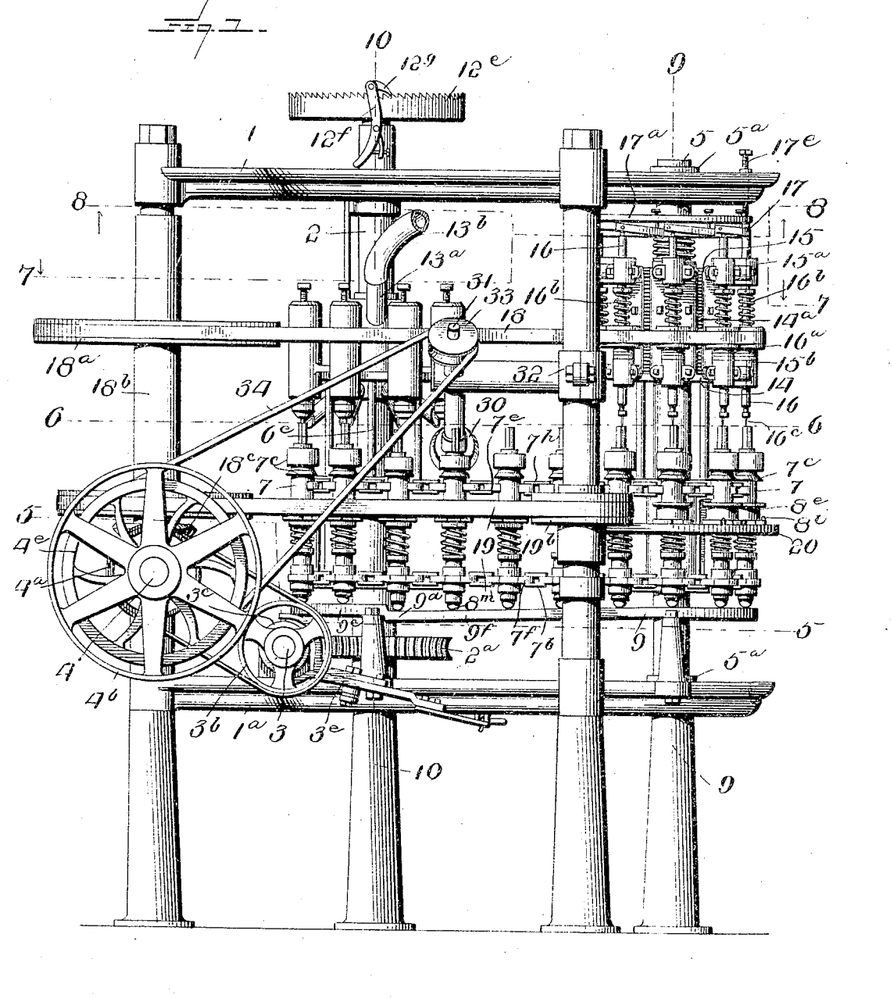
Figure 1 is a side elevation of the complete machine looking from the drive side thereof.
Figure 2:
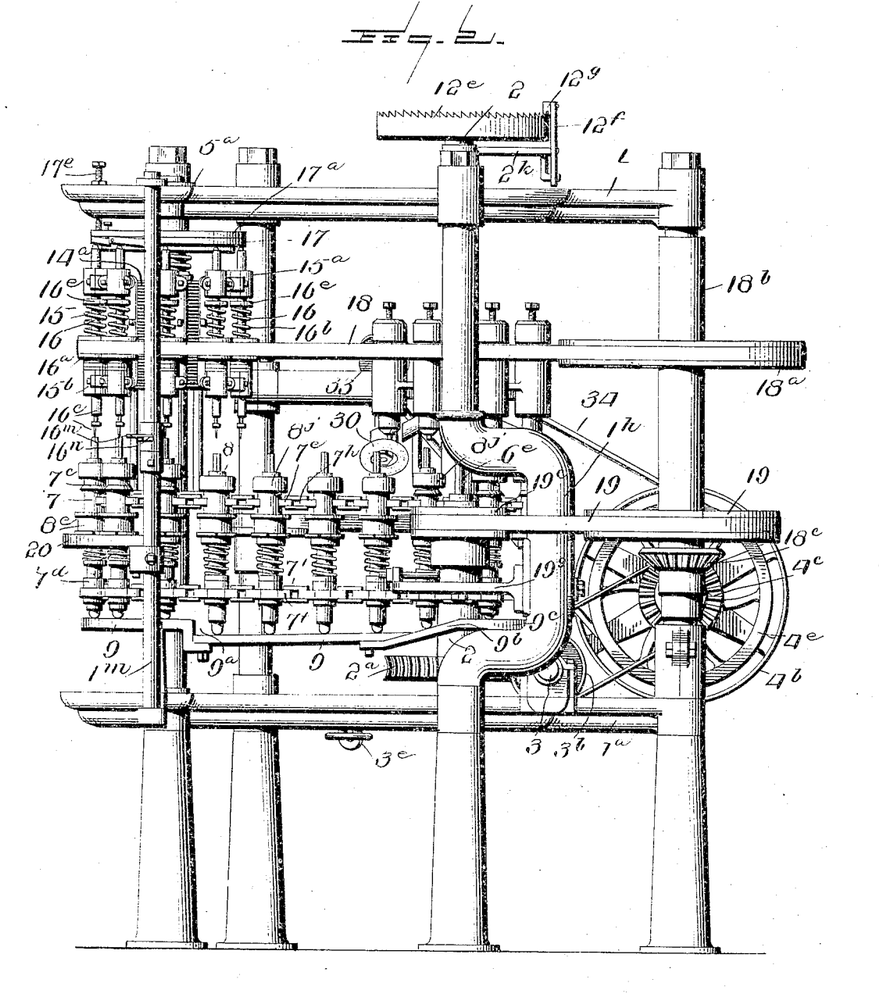
Fig. 2 is a similar view of the opposite side of the machine.

*The facing-tool sharpener.*—An emery-wheel 30 is mounted on the inner end of a shaft 31, which is journaled in adjustable bearings 32, attached to the main frame, as shown in Figs. 1, 4, and 9. This shaft is provided with a pulley 33 on its outer end, which is driven by a belt or cord 34 from a pulley $4^e$ on shaft 4, as shown. As the facing-tool holder revolves the facing-tools, after having operated upon the blanks, come into contact with the emery-wheel and are sharpened before they again come into active operation and, moreover, are kept relatively true, so that the blanks will be reduced to uniform thickness.

Operation: After the facing-tools and drills have been properly positioned and the machine started the operator feeds the button-blanks to the chucks at the front of the machine just before they pass to the facing or trimming tools. The chucks come in succession before the operator ready to receive a blank and close thereon as the chucks rise toward the sprockets on shaft 2, by which they are steadied and kept in exact alinement with the overlying cutting-tool, and as they rise on the track their pulleys come in contact with belt 19, and they are rapidly rotated on their own axes while they travel with the superimposed cutter during a half-revolution of shaft 2. When they reach the opposite side of the machine, the chucks are lowered sufficiently to permit the cutters to clear the blanks as the chucks and cutters diverge, the cutters moving around toward the infeed side of the machine, while chucks move on toward the drills, and as they come under the control of sprocket-disks 6 $6^a$ on shaft 5 they are steadied and alined with the superimposed drill-spindles and move on around shaft 5 therewith, and as they move together the drill-spindle is repeatedly lowered to pierce the holes in the blanks, and in the intervals between the drilling operations the chucks are partially turned on their own axes, so as to cause the holes to be drilled at the desired points. After passing the drills the chucks are dropped, so as to release the buttons and open ready to receive another blank before they again reach the facing-tools. Thus each chuck carries a blank successively to the facing and centering tools and then to the drills and does not release it until the several operations are complete. Every chuck carries a blank and is adapted to coöperate with any tool or drill, and a number of blanks are simultaneously operated upon at different points in the machine, and all the operations occur while the blanks and chucks are traveling, which greatly increases the capacity or output of the machine.

Having thus described our invention, what we therefore claim as new, and desire to secure by Letters Patent thereon, is—

1. In a button-machine, a plurality of adjacent series of button-working tools, each series moving in a separate predetermined orbit; with a series of button-holders moving in a different orbit; the orbits of the holders coinciding at different points with the orbits of the several series of button-working tools, substantially as described.

2. In a button-machine, a series of button-working tools moving in an endless path, a series of button-holders or chucks moving in another endless path, the orbits of the tools and holders coinciding for a portion of their length, at which point the tools and holders travel together, and means for causing the tools to operate upon the blanks during their coincident travel, substantially as described.

3. In a button-machine, a pair of horizontal sprockets and an endless horizontal carrier mounted on and moved with said sprockets, members of said carrier comprising vertical holders containing rotatable and vertically-movable button-holding chucks.

4. In a button-machine, the combination of an endless chain, members of said chain constituting vertical holders containing rotatable and vertically-movable button-holding chucks, and horizontal sprockets for guiding said chain adapted to engage the chuck-holders, and means for rotating the chucks.

5. In a button-machine, the combination of a traveling series of button-working tools, and an adjacent traveling series of button-working tools, individually rotatable on their own axes; with a traveling series of blank-holders or chucks movable successively from one series of tools to the other, and adapted to coincide with the tools in both sets at certain points of their travel, and means for rotating the chucks while coincident with the tools in the first set, substantially as described.

6. In a button-machine, the combination of a traveling series of button-working tools, non-rotatable on their individual axes, and an adjacent traveling series of button-working tools, individually rotatable on their own axes; with traveling blank-holders or chucks movable from one series of tools to the other, and adapted to coincide and travel with the tools in both sets during portions of their travel, and means for rotating the chucks coincident with the tools in the first set, substantially as described.

7. A chuck-carrier for button-machines comprising a series of chuck-holders each consisting of a pair of axially-alined connected sleeves, rotatable chucks journaled in the sleeves, and links pivotally connecting adjacent sleeves, and forming therewith an endless-chain carrier, substantially as specified.

8. In a button-machine, a series of button-working tools, moving in an orbital path and a series of button-holders moving in a different orbital path, the orbit of the holders coinciding at certain points with the orbit of the tools so that at such points the tools and holders travel together, substantially as described.

9. In a button-machine, a series of button facing or centering tools moving in an endless path, a series of button-drilling tools moving in another endless path, and a series of button-holders or chucks moving in a different endless path, the orbits of both sets of tools coinciding for a portion of their length; with the orbit of the holders, and means for causing the several tools to operate upon the blanks during the coincident portion of their travel, substantially as described.

10. In a button-machine, a pair of horizontal sprockets, an endless horizontal carrier mounted on and moved with said sprockets, members of said chain comprising chuck-holders, with chucks in said holders and a horizontal track for guiding and supporting the chucks in the holders.

11. In a button-machine, the combination of an endless chain, members of said chain constituting chuck-holders, sprocket-disks for guiding said chain adapted to engage the chuck-holders, and chucks in said holders; with tools adapted to operate upon the blanks in the chucks, and means for rotating the chucks while the blanks are being operated upon, substantially as described.

12. In a button-machine, the combination of an endless chain, members of said chain constituting chuck-holders, and sprockets for guiding said chain adapted to engage the chuck-holders; with button-drilling tools adapted to operate upon the blanks in the chucks, and move therewith during such operations, and means for preventing rotation of the chucks during the drilling operations.

13. In a button-machine, the combination of an endless chain, members of said chain constituting chuck-holders, and sprockets for guiding said chain adapted to engage the chuck-holders; with button-drilling tools adapted to operate upon the blanks in the chucks, means for preventing rotation of the chucks during the drilling operations, and means for partly turning the chucks after a hole is pierced in the blank, substantially as described.

14. In a button-machine, the combination of a series of button-working tools, and an adjacent series of button-working tools, individually rotatable on their own axis; with blank-holders or chucks movable from one series of tools to the other, and adapted to coincide with the tools at certain points, and means for rotating the chucks coincident with the tools in the first set; means for rotating the tools in the second set while coincident with the chucks, and means for raising and lowering the chucks during their travel to subject the blanks to the actions of the tools, substantially as described.

15. In a button-machine, the combination of a rotating series of button-working tools, non-rotatable on their individual axes, and an adjacent rotating series of button-working tools, individually rotatable on their own axes; with blank-holders or chucks movable from one series of tools to the other, and adapted to coincide and move with the tools for predetermined portions of their travels, and means for rotating the chucks coincident with the tools in the first set, means for rotating the tools in the second set while coincident with the chucks, and means for raising and lowering the chucks during their travel to subject the blanks to the actions of the tools, substantially as described.

16. In a button-machine, the combination of a series of facing or centering tools, an adjacent series of drills, means for rotating the drills during their operations, a movable chuck-carrier, and a series of chucks moved thereby; with means for traveling the carrier so as to bring the chucks into operative relation successively with the facing or centering tools and with the drills, means for rotating the chucks on their axes during the facing or centering operations, and means for turning them step by step between the drilling operations substantially as described.

17. In a button-machine, the combination of a rotary series of facing or centering tools, an adjacent rotary series of drills, means for rotating the drills during the operative portions of their travel; an endless chuck-carrier, a series of chucks moved thereby, and means for traveling the carrier so as to bring the chucks into operative relation successively with the facing or centering tools and with the drills; with means for rotating the chucks on their axes during the facing or centering operations, and for turning them step by step between the drilling operations, substantially as described.

18. In a button-machine, the combination of a series of facing or centering tools, an adjacent series of drills, means for rotating the drills during their operations, an endless chuck-carrier, and a series of chucks moved thereby; with means for traveling the carrier so as to bring the chucks into operative relation successively with the facing or centering tools and with the drills, means for rotating the chucks on their axes during the facing or centering operations, means for turning them step by step between the drilling operations, means for intermittently depressing the drills when in operative positions, and a track supporting the chucks and adapted to cause them to present the blanks to the tools during the several operations and then release the blanks, substantially as described.

19. In a button-machine, the combination of a rotary series of facing or centering tools, an adjacent rotary series of drills, means for rotating the drills during the operative portions of their travel, a movable chuck-carrier, a series of chucks moved thereby, and means for traveling the carrier so as to bring the chucks into operative relation successively with the facing or centering tools and with the drills; with means for rotating the chucks on their axes during the facing or centering operations, and for turning them step by step between the drilling operations, cams for intermittently depressing the drills when in operative positions, and a cam-track supporting the chucks and adapted to cause them to present the blanks to the tools during the several operations thereon, and then release the blanks, substantially as described.

20. In a button-machine, the combination of a series of cutting-tools, a chambered head carrying the same, suction-pipes extending from the chamber to the proximity of the tools, a cup in said chamber, and a suction-pipe leading from the cup, substantially as described.

21. The combination of a rotary series of cutting-tools, a central chamber, suction-pipes extending from the chamber to the proximity of the tools, a non-rotatable cup in said chamber, and a suction-pipe leading from the cup, said cup having a depending flange to cut off the suction-pipes leading to idle tools, substantially as described.

22. In a button-machine, the combination of a rotating hollow shaft, a vertically-movable tool-carrier thereon rotatable therewith, a rod connected to said carrier, a rotatable threaded sleeve supported on said shaft and upholding said rod, a ratchet-wheel on the upper end of the sleeve, and means for turning said ratchet step by step whereby the carrier is automatically lowered, substantially as described.

23. In a button-machine, the combination of a rotating hollow shaft, a vertically-movable tool-carrier thereon, rotatable therewith; a rod within the shaft connected to said carrier by a pin transfixing the rod and a slot in the shaft, a rotatable threaded sleeve upholding said rod and mounted in the shaft, a ratchet-wheel on the upper end of the sleeve, and means for turning said ratchet step by step as the shaft and carrier rotate, substantially as described.

24. A chuck-carrier for button-machines, comprising a series of connected sleeves, spindles journaled therein, chucks mounted in the spindles, links connecting adjacent sleeves, and forming therewith an endless chain, springs for upholding the spindles, and means for rotating the spindles, substantially as described.

25. A chuck-carrier for button-machines, comprising a series of connected sleeves, and chucks mounted in the sleeves, and links connecting adjacent sleeves, and forming therewith an endless chain; with opposite notched disks adapted to engage the sleeves to uphold the carrier and button-finishing tools coöperating with the carrier, substantially as described.

26. A chuck-carrier for button-machines, comprising a series of connected sleeves, spindles journaled therein, chucks mounted in the spindles, links connecting adjacent sleeves and forming therewith an endless chain, springs for upholding the spindles, and means for rotating the spindles; with opposite notched disks adapted to engage the sleeves to uphold the carrier and move the same, and button-finishing tools coöperating with the carrier, substantially as described.

27. In combination, a pair of parallel shafts, notched or sprocket disks thereon, an endless chain-carrier supported on and between said disks, said carrier comprising members having sleeves, and rotatable chucks journaled in and movable longitudinally of said sleeves; with sets of tools supported on the shafts above the disks and adapted to coact with the chucks when their sleeves are held by the disks, and means for supporting the chucks and bringing them and the tools into coöperative relation, substantially as described.

28. In combination, a pair of parallel shafts, notched or sprocket disks thereon, an endless chain-carrier supported on and between said disks, said carrier comprising members having upper and lower connected sleeves, spindles rotatably mounted in said sleeves and chucks rotatable with and movable longitudinally of said spindles; with sets of tools supported on the shafts above the disks and adapted to coact with the chucks when the chuck-holding sleeves are engaged with the disks, means for supporting the chucks in their travel, and means for causing the tools to operate upon the blanks held by the chucks while the chucks and tools are in conjunction and traveling together, substantially as described.

29. In a button-machine, the combination of a movable support, the vertically-movable spindle journaled therein, the spring for uplifting the spindle, and a cam for depressing the spindle, said cam being pivoted to a stationary support at one end, and means for adjusting the other end of the cam to regulate the depression of the spindle, substantially as described.

30. The combination with the movable chucks, and a movable tool-holder, a series of vertically-movable spindles mounted on said holder, springs for uplifting said spindles, a fixed support above the holder, cams pivoted to the support at one end, and screws for adjusting the other ends of said cams, said cams being adapted to engage and depress the spindles as the holder rotates, substantially as described.

31. In a button-machine, the combination of a carrier comprising pairs of rigidly-connected alined sleeves, and links connecting adjacent pairs of sleeves; with sprocket-wheels or disks adapted to engage the sleeves to support and guide the carrier, tubes journaled in said alined sleeves, pulleys and angular blocks on the tubes, springs for upholding the tubes and chucks mounted within and rotatable with the tubes, substantially as described.

32. The combination of a pair of alined and connected sleeves, a rotatable tube journaled therein, provided with a pulley, and a spring interposed between the pulley and lower sleeve for uplifting the tube, a chuck slidably mounted within the tube and rotatable therewith, and means for moving the sleeves laterally; with a guide beside the path of the tube provided with pins and notches adapted to turn the tube and chuck partly around as they move along the guide, and mechanism for drilling the blank held in the chuck, substantially as described.

33. In a button-machine, the combination of a carrier comprising pairs of rigidly-connected alined sleeves, and links connecting adjacent pairs of sleeves; with sprocket-wheels or disks adapted to engage the sleeves to support and guide the carrier, tubes journaled in said alined sleeves, pulleys and angular blocks on the tubes, springs for upholding the tubes, and chucks mounted within and rotatable with the tubes, a cam plate or track arranged beneath the carrier to uphold and regulate the position of the chucks, and a curved guide provided with pins and notches adapted to turn the tubes and chucks partly on their axes as they move along the guide, all substantially as and for the purpose described.

In testimony that we claim the foregoing as our own we affix our signatures in presence of two witnesses.

NICHOLAS BARRY, JR.
PATRICK J. BARRY.

In presence of—
E. W. SMITH,
M. W. STAPLETON.